US006988031B2

(12) United States Patent
McDonald et al.

(10) Patent No.: US 6,988,031 B2
(45) Date of Patent: Jan. 17, 2006

(54) SYSTEM AND METHOD FOR DETERMINING ENGINE STOP POSITION

(75) Inventors: Dennis McDonald, Canton, MI (US); Ross D. Pursifull, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/752,996

(22) Filed: Jan. 7, 2004

(65) Prior Publication Data

US 2005/0149249 A1 Jul. 7, 2005

(51) Int. Cl.
*G06F 19/00* (2006.01)

(52) U.S. Cl. ....................................... 701/112; 123/397

(58) Field of Classification Search ................ 701/100, 701/103, 112; 123/397, 399, 198 D, 178.4
See application file for complete search history.

(56) References Cited

U.S. PATENT DOCUMENTS

| | | | | |
|---|---|---|---|---|
| 3,482,562 | A | 12/1969 | Ranft | |
| 3,895,615 | A | 7/1975 | Schubeck | |
| 4,453,402 | A | 6/1984 | Grant | |
| 4,520,658 | A | 6/1985 | Ryan et al. | |
| 4,924,827 | A | 5/1990 | Minegishi | |
| 4,966,113 | A | 10/1990 | Fujimoto | |
| 5,072,702 | A * | 12/1991 | Sasaki et al. | 123/179.4 |
| 5,447,143 | A | 9/1995 | Ott et al. | |
| 5,604,304 | A | 2/1997 | Kokubo et al. | |
| 5,613,473 | A | 3/1997 | Angermaier | |
| 6,253,145 | B1 | 6/2001 | Garrard et al. | |
| 6,435,158 | B1 | 8/2002 | Mingo et al. | |
| 6,499,342 | B1 | 12/2002 | Gonzales, Jr. | |
| 6,499,455 | B1 | 12/2002 | Page et al. | |
| 6,604,497 | B2 | 8/2003 | Buehrle, II et al. | |
| 2003/0163243 | A1 | 8/2003 | Inoue | |
| 2003/0163244 | A1 | 8/2003 | Ando et al. | |
| 2005/0109302 | A1 * | 5/2005 | Tetsuno et al. | 123/179.5 |

FOREIGN PATENT DOCUMENTS

| | | |
|---|---|---|
| FR | 2663415 | 12/1991 |
| JP | 52029539 | 3/1977 |
| JP | 60062665 | 4/1985 |
| JP | 62178734 | 8/1987 |
| JP | 02233837 A | 9/1990 |
| JP | 05033677 | 9/1993 |
| JP | 08261053 | 10/1996 |
| JP | 1107793 | 4/1999 |
| JP | 11107823 | 4/1999 |

* cited by examiner

*Primary Examiner*—John T. Kwon
(74) *Attorney, Agent, or Firm*—Brinks Hofer Gilson & Lione

(57) ABSTRACT

The present invention provides a system for determining engine stop position and includes an engine tracking subsystem and a throttle control subsystem. The engine tracking subsystem is coupled to the engine and determines the engine position by sensing rotation of the crankshaft. Once the engine controller receives an engine shutdown signal, the throttle is controlled to lower the air pressure in the intake manifold of the engine. Lowered as such, the resulting reversal torque caused by compression of air in the cylinders is smaller than the friction load torque of the engine and engine reversal is eliminated or substantially reduced. When the engine has stopped, the engine tracking system stores the last engine position for use during the next engine startup.

17 Claims, 5 Drawing Sheets

SYSTEM AND METHOD FOR DETERMINING ENGINE STOP POSITION

BACKGROUND

1. Field of the Invention

The present invention generally relates to a system and method for tracking the angular position of an engine's crankshaft.

2. Description of Related Art

Various systems for tracking the angle of an engine are known. Known systems determine the engine position from a sensor that generally works only above a minimum speed. These systems are based on a profile of the rotation of two engine position wheels, one on the crankshaft and one on the camshaft. In addition, at start-up these systems require the engine to initially rotate through an angle before the engine position becomes known. The amount of requisite angular displacement is dependent on the initial engine position.

It is desirable to know the engine position at engine startup, as this allows the system to fuel and ignite the very first possible cylinder. In the example of a port injected engine, the first possible cylinder would be the cylinder with an open or about to be opened intake valve. The benefits available from early ignition include minimization of tailpipe hydrocarbon emissions due to "crank-through" of fuel vapors from the intake manifold to the exhaust manifold, the minimization of crank time, and the reduction of crank time variability.

Typically, determination of engine position or engine tracking begins at engine crank and is not complete until some amount of engine rotation. The requisite rotation can slightly exceed two revolutions, depending on configuration. People have proposed systems that leave the controller powered after the engine off command and track the engine position until it comes to rest. However, known sensors have difficulty identifying engine reversals as the engine slows to a stop. Further, methods to detect the reversals are complex and can become unreliable in the presence of missing teeth on the position encoder wheel.

In view of the above, it is apparent that there exists a need for an improved engine position tracking system.

SUMMARY

In satisfying the above need, as well as overcoming the enumerated drawbacks and other limitations of the related art, an embodiment of the present invention provides a system that includes an engine tracking subsystem for determining engine angle and a throttle configured to lower air pressure in the engine's intake manifold and thus lower the ingested air thereby reducing the cylinders compression torque based on an engine shutdown signal.

The engine tracking subsystem is coupled to the engine and determines the angle of the engine by sensing rotation of the crankshaft. As the engine controller receives an engine shutdown signal, the throttle is controlled to lower the air pressure in the intake manifold of the engine. The air pressure is lowered such that the resulting reversal torque caused by compression of air in the cylinders is smaller than the friction torque of the engine thereby minimizing or eliminating engine reversal. To lower the air pressure, the throttle is closed and remains closed until the engine is stopped. Thereafter, the throttle is slightly opened increasing the air pressure in the engine to avoid the drawing of exhaust fumes back into the intake manifold. When the engine is stopped, the engine tracking system stores the engine angle for use during engine startup. Because engine reversal has been eliminated, the stored engine angle remains the correct engine position for the next startup. Alternatively, if valve actuation is available (Variable Cam Timing, or Electrically Actuated Valves) a cylinder's compression torque can be reduced by altering the valve timing, (for example: late closing of the intake valve).

In a foot-operated throttle system, a throttle bypass valve provides air control when the driver's foot is off the accelerator pedal. Alternatively, instead of a throttle valve being commanded to close at the engine-off command, a throttle bypass valve could be commanded to close.

In another aspect of the invention, the throttle is closed immediately upon key-off. The fuel injection system is configured to continue injecting for a predetermined time after key-off. Further, the ignition system is configured to continue sparking after the fuel injection has ceased. By allowing fuel injection and spark ignition for a short time after engine-off request, while still closing the throttle at the engine-off request, the intake manifold pressure is lower than it would otherwise be if all the actions were taken simultaneously.

Further objects, features and advantages of this invention will become readily apparent to persons skilled in the art after a review of the following description, with reference to the drawings and claims that are appended to and form a part of this specification.

DETAILED DESCRIPTION

Figure 1:
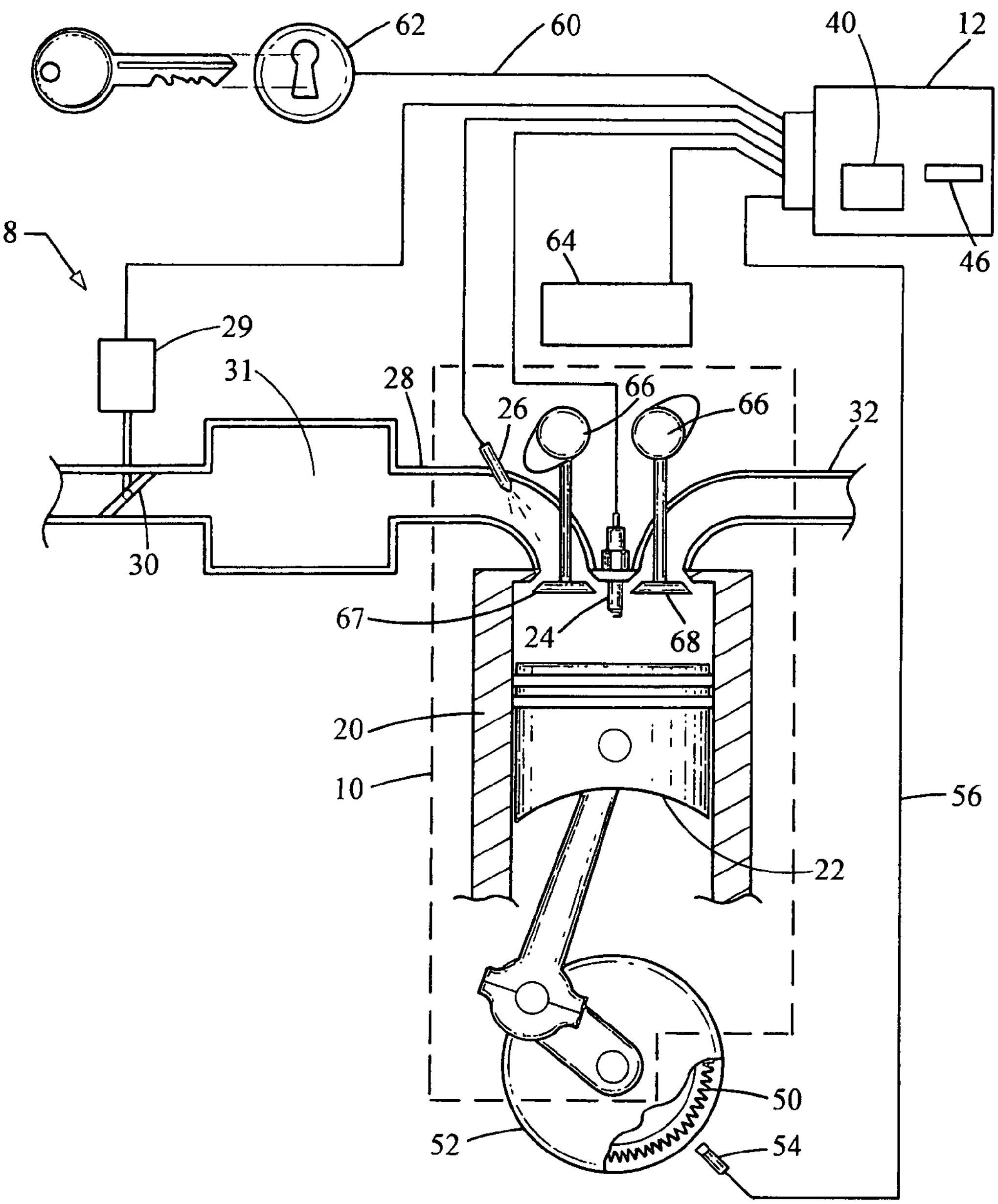
FIG. 1 is a diagrammatic view of an engine and controller including a system for determining the engine stop position according to the present invention.

Referring now to FIG. 1, a system 8 embodying the principles of the present invention is illustrated therein. The system generally includes an engine 10 and a controller 12.

The engine 10 is shown as an internal combustion engine having a throttle 30, a piston 22, and a cylinder 20. As will be apparent from the discussion that follows, the engine 10 could be provided with any number of cylinders and the system 8 readily adapted thereto. Each cylinder 20 houses a piston 22 mounted for reciprocal movement therein. Combustion in the cylinder 20 will cause movement of the piston 22 resulting in a rotation of the crankshaft 48, which is used to transfer power from the engine 10 to the drivetrain and other systems within the vehicle.

Air entering the cylinder 20 from the intake manifold 28 is controlled by the throttle 30 and is combined with fuel, injected from a fuel injector 26, to form a gas/air mixture in the cylinder 20. The fuel injector may inject directly into the cylinder as shown or it may inject into the intake port. A spark is generated by a spark plug 24 to initiate combustion in the cylinder 20 thereby creating motion of the piston 22. To create continuous rotation of the crank shaft 48, the pistons 22 are positioned at varying engine angles relative to the crank shaft 48 and the controller 12 synchronizes combustion in each cylinder to cause a smooth rotation of the crank shaft 48. After combustion, exhaust gasses are forced out of the cylinders 14, as the piston 22 rises on the next part of its cycle and exit through the exhaust manifold 32.

As the engine 10 produces continuous rotation of the crankshaft 48, a flywheel 52 is also rotated. Teeth 50 are provided at equally spaced positions around the circumference or perimeter of the flywheel 52 with one or two teeth missing. A sensor 54, located proximate to the flywheel 52, produces a signal as each tooth 50 is rotated therepast. This signal is provided to the controller 12 along line 56. The controller 12 includes a microprocessor 40 which counts the number of signals provided from the sensor 54. By counting the signals, the microprocessor 40 can keep track of the engine position or angle.

Additionally, the microprocessor 40 optimizes the engine's performance by controlling the fuel injectors 26, the timing of the spark plugs 24, and the throughput of the throttle 30. The position of the throttle 30 controls the amount of air allowed to flow through the intake manifold plenum 31 to the intake manifold 28 and into the cylinder 20. The position of the throttle 30 is manipulated by the controller 12 through the throttle actuator 29. The air flow into the cylinder 20 can also be controlled through cam timing. The timing of the cam shafts 66 can be manipulated by the controller 12 through the cam timing actuator 64. The cam shafts 66 drive the opening and closing of the intake valve 67 and exhaust valve 68.

As a key switch 62 is switched to the off position, an engine shutdown signal is sent along line 60 to the controller 12 thereby initiating an engine shutdown sequence in the microprocessor 40. During the shutdown sequence, engine position continues to be monitored by the sensor 54 and the controller 12. After the engine has stopped, the last engine position is stored in a memory 46 of the controller 12 for use in the next engine startup.

The engine shutdown sequence operates to reduce the engine's maximum compression torque to near or lower than the engine's friction torque in order to eliminate or reduce engine reversal on spin down. Lowering compression torque is readily accomplished by closing the throttle 30.

In addition, various forms of valve timing control are coming into use on automotive engines. Since valve timing influences the mass of gasses that are compressed in the cylinder 20, valve timing is a way to either augment or substitute for closing the throttle 30. While many compression torque reducing schemes are contemplated, the most readily accomplished scheme is to close the intake valve 67 later than normal. With ideal valving, the intake valve 67 is closed at the beginning of the compression stroke. If the intake valve 67 closing is delayed, then some gas consisting of air and residual combustion products can be pushed backwards out of the intake valve 67 instead of being compressed in the cylinder 20. Effectively, this reduces the engine's compression ratio and compression torque is reduced, thus reducing the engine's propensity to reverse as it slows to a stop.

Figure 2:
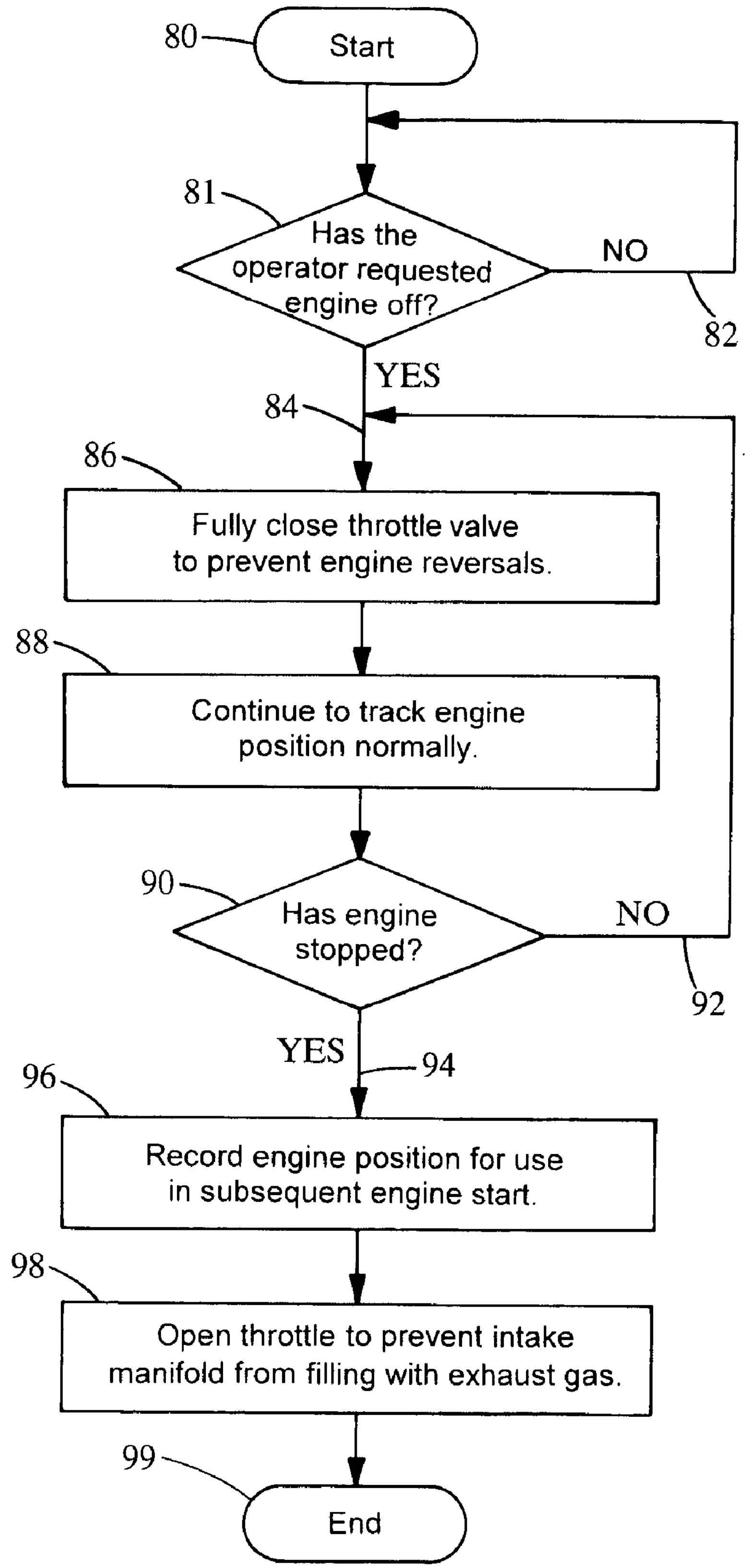
FIG. 2 is a flow chart of an engine shutdown sequence according to the present invention.

An engine shutdown sequence in accordance with the present invention is shown in FIG. 2. Referring thereto, the process begins in block 80. In block 81, the controller 12 determines if an engine shutdown signal has been received, for example, by key switch 62 being moved to its "off" position. If an engine shutdown signal has not been received, the engine continues to run normally as indicated by the loop of line 82. If an engine shutdown signal has been received, the sequence flows along line 84 and the air pressure in the intake manifold 28 is decreased by fully closing the throttle 30 to prevent engine reversals, as denoted by block 86. In the case of a foot operated throttle, the throttle 30 is referred to as an idle bypass valve. As shown in box 88, the engine tracking system continues to track the engine position during the shutdown sequence. Next, in block 90, the system determines if the engine 10 is fully stopped. If the engine 10 is not fully stopped, the sequence follows the loop of line 92 allowing the system to maintain a low intake manifold pressure with the throttle 30 closed (block 86) and continue to track the engine position (block 88). However, if the engine 10 has stopped, the logic flow follows line 94 and the engine position is recorded for use in a subsequent engine startup, as denoted by box 96. After the engine position has been recorded or simultaneous therewith, the throttle 30 is opened, generally equalizing pressure in the system 8 to prevent the intake manifold 28 from filling with exhaust gas. Preferably, the default throttle position at engine stop is open between 3° and 8°. The process then ends at block 99.

Figure 3:
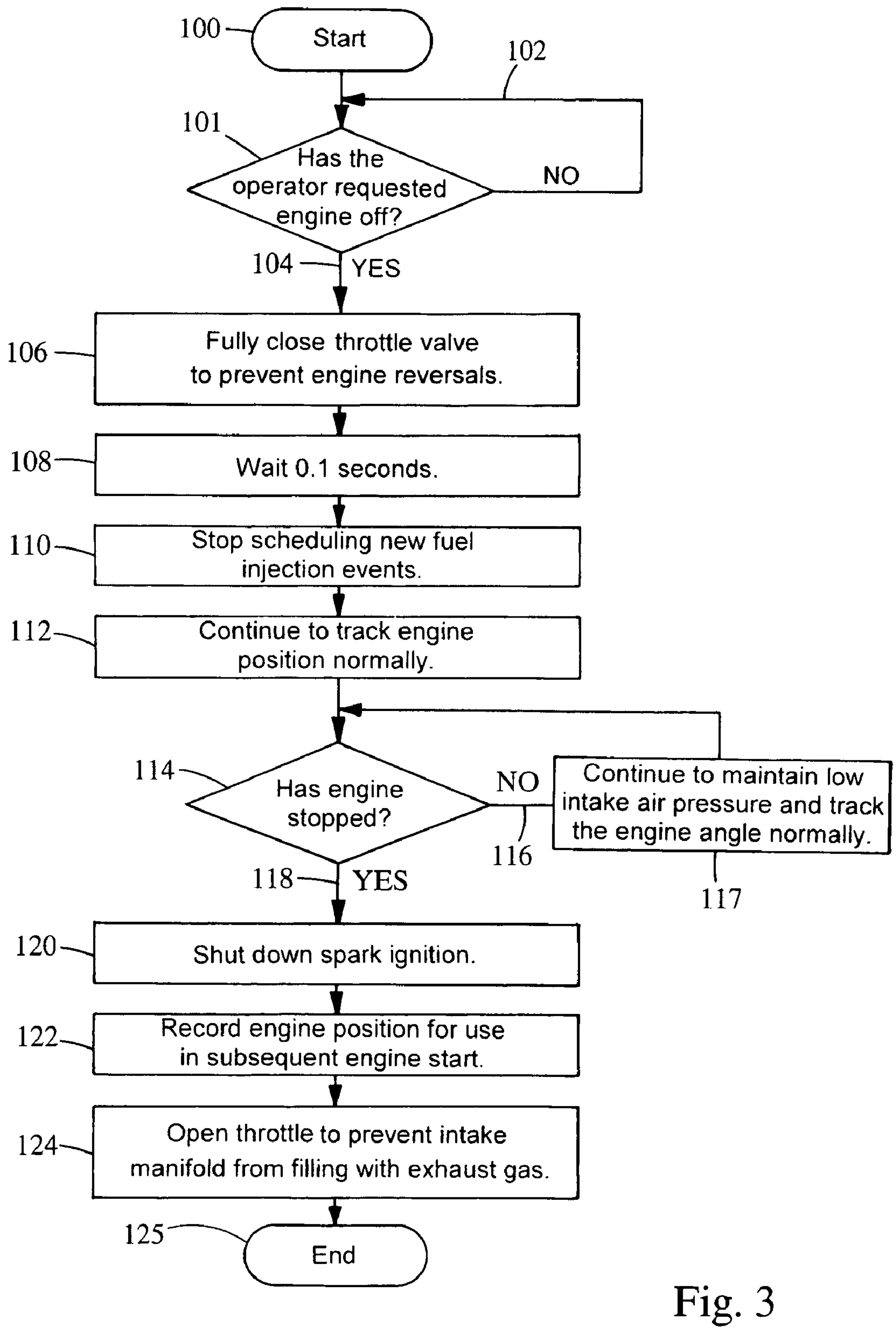
FIG. 3 is a flow chart providing another embodiment of an engine shutdown sequence according to the present invention.

Now referring to FIG. 3, another embodiment of an engine shutdown sequence according to the present invention is provided therein. At block 100 the engine shutdown sequence begins. In block 101, the controller 12 determines whether an engine shutdown signal has been received. If an engine shutdown signal has not been received, the engine 10 continues to run as normal, as denoted by the loop of line 102. However, if an engine shutdown signal has been received, the engine shutdown sequence flows along line 104 where air pressure in the intake manifold 28 is reduced, by fully closing the throttle 30, to prevent engine reversals. This is denoted by block 106. Block 108 indicates that a predetermined delay, either time based (for example 0.1 seconds), or fuelling event based (for example, 2 fuel injection events) is provided after which the controller 12 stops scheduling new fuel injection events, as denoted by block 110. As indicated by block 112, the controller 12 continues to track the engine position as is normally done. In block 114, the controller 12 determines whether the engine 10 has fully stopped. If the engine 10 has not stopped, the shutdown sequence flows along the loop of path 116 where the controller 12 continues to maintain low intake air pressure and to track the engine position, as denoted by block 117. However, if the engine 10 has fully stopped, the shutdown sequence follows along line 118 and the spark ignition is fully shutdown, as denoted by block 120. The engine position is then recorded for use in the next engine startup, as denoted by block 122. In block 124, the throttle 30 is open to prevent the intake manifold 28 from filling with exhaust gas. The process then ends at block 125.

Figure 4:
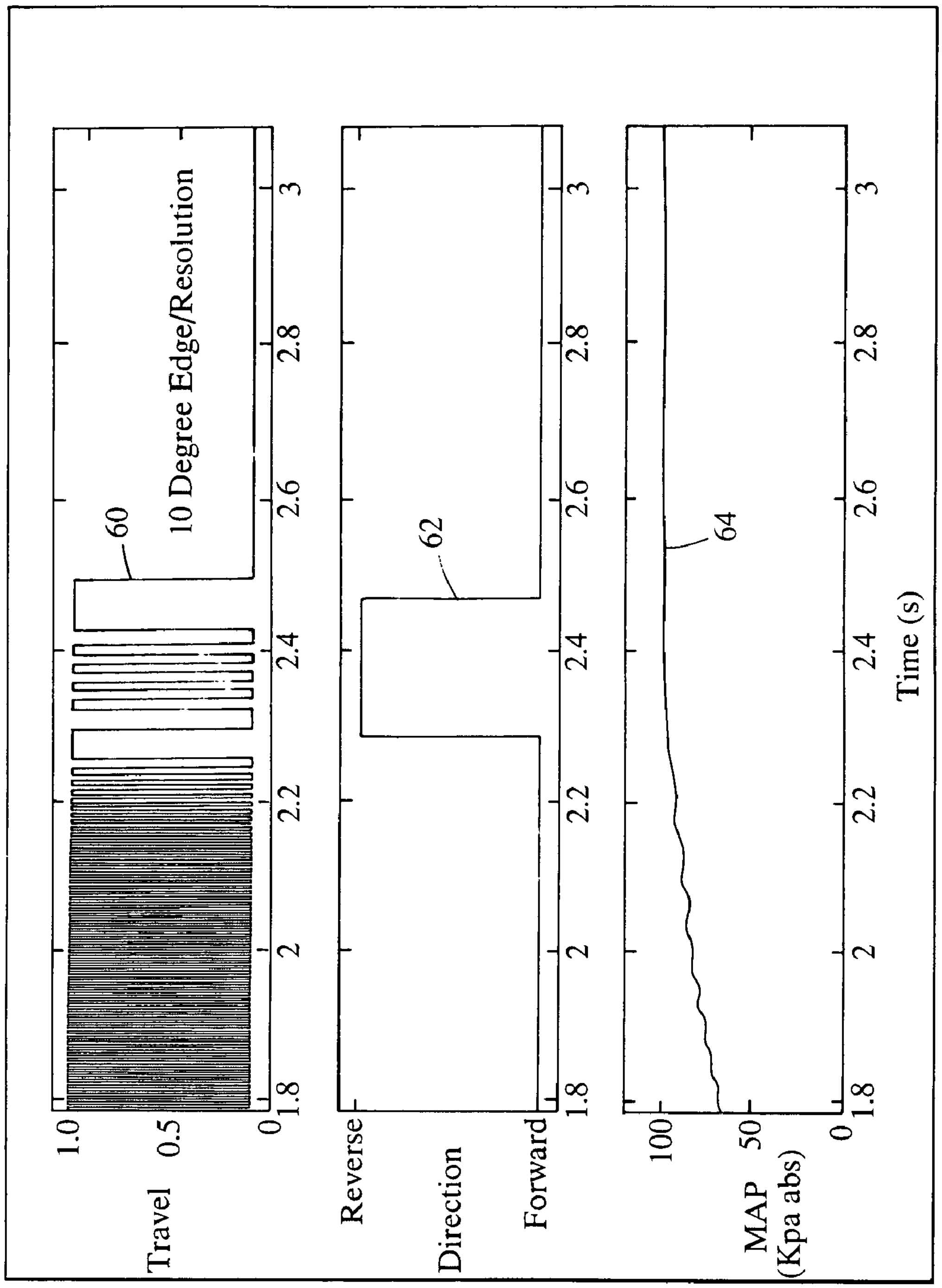
FIG. 4 is a plot of engine angle travel with a normal intake manifold pressure according to the present invention.

As noted above, the lowering of the air pressure in the intake manifold 28 is instrumental in preventing engine reversals. Now referring to FIG. 4, line 60 shows the travel of the engine as measured with a laboratory instrument, a quadrature encoder, with each vertical transition indicating a 0.25° movement of the engine; line 62 denotes the direction of travel of the engine (either forward or reverse); line 64 denotes conventional manifold pressure; all the above represented as typically provided by known systems. With conventional manifold pressure during engine shutdown, the engine moves forward slowing down (as seen with line 60 generally at 2.2–2.3s) and reversing as line 62 goes high. The change in the direction of engine travel is due to the reversal torque of the air compressed in the cylinders overcoming the engine inertial torque and friction torque. Thereafter, the engine reverses again, as denoted by line 62 going low (between 2.4 and 2.5s) as the air in the opposite cylinders is compressed and overcomes the engine inertial torque and the friction torque to move in the reverse or forward direction. Inspection and analysis of the signal represented by line 60, indicates that the full reverse travel of the engine is approximately 90.75° under conventional manifold pressure.

Figure 5:
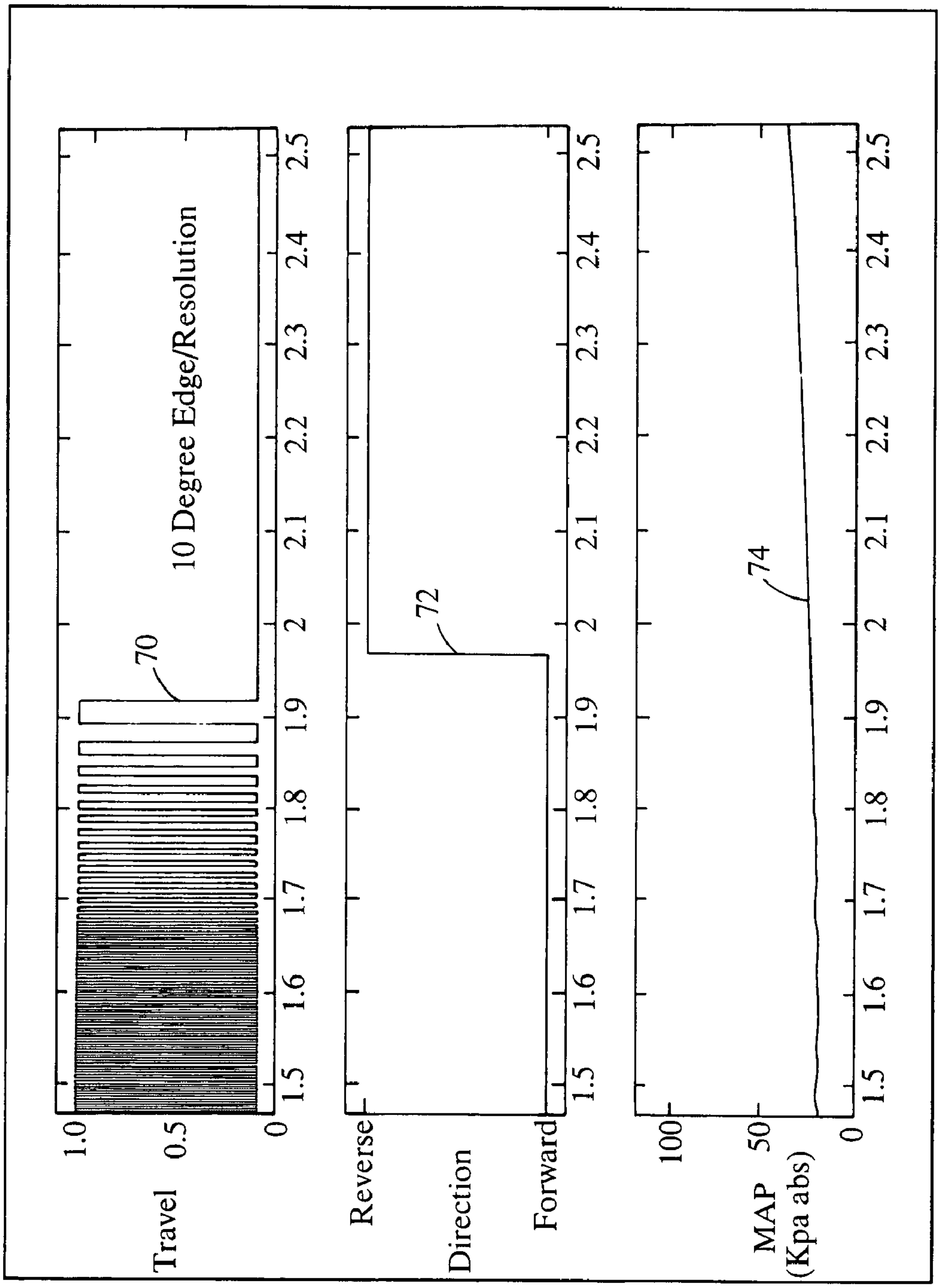
FIG. 5 is a plot of engine angle travel with low intake manifold pressure according to the present invention.

When closing the throttle 30 to lower the manifold pressure in accordance with the present invention, referring to FIG. 5, the manifold pressure is represented by line 74; line 72 represents the direction of engine travel, by line 72 transitioning high, and indicates the direction of the engine 10 did reverse once; and line 70 represents the rotation of the engine 10 where each vertical transition represents a 0.25° increment of movement. As can be seen from line 70, the engine 10 progressively slowed and, although it reversed slightly as line 72 indicates by its high transition, the amount of reverse rotation was smaller than 0.25° in that there is no corresponding vertical component to line 70. Further analyzing the signal represented by line 70, it was determined the engine had produced a reverse rotation of approximately 0.25°. The reduced engine reversal provides an accurate engine position that can be used to optimize engine startup thereby reducing hydrocarbon emission, minimizing crank time, and reducing crank time variability.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A system for determining a stop position of an engine, the system comprising:

a sensor configured to generate a signal corresponding to the angle of the engine;

a controller coupled to the sensor and configured to receive the signal; and an air flow control device coupled to the engine to control air intake, the controller being configured to control the air flow control device to lower air pressure in the engine based on an engine shutdown signal.

2. The system according to claim 1, wherein the sensor is a variable reluctance sensor.

3. The system according to claim 1, wherein the sensor is a Hall Effect sensor.

4. The system according to claim 1, wherein the air flow control device is an intake valve.

5. The system according to claim 1 wherein the air flow control device is a throttle flow bypass valve.

6. The system according to claim 1, wherein the air flow control device is configured to lower the air pressure such that a resulting reversal torque is smaller than a friction torque of the engine.

7. The system according to claim 1, wherein the air flow control device is a motorized throttle.

8. The system according to claim 7, wherein the controller is configured to fully close the throttle based on the engine shutdown signal.

9. The system according to claim 8, wherein the controller closes the throttle until the controller determines the engine has stopped.

10. The system according to claim 8, wherein the controller is configured to open the throttle when the engine tracking system determines the engine is stopped.

11. The system according to claim 7, wherein the default throttle position is open.

12. The system according to claim 7, wherein the default throttle position is open between 3 and 8°.

13. The system according to claim 1, wherein the controller is configured to increase intake manifold pressure after the engine has stopped.

14. The system according to claim 1, further comprising a memory, wherein the controller is configured to store an angular engine stop position in the memory, for use during a subsequent engine startup.

15. The system according to claim 1, further comprising a fuel injection system configured to continue injecting fuel for a predetermined time after the engine shut down signal and before the engine has stopped.

16. The system according to claim 1, wherein the fuel injection system is configured to stop injecting fuel a predetermined time after the air flow control device has lowered the manifold pressure.

17. The system according to claim 1, further comprising an ignition system wherein the ignition system is configured to stop spark ignition after the engine has stopped.

* * * * *